United States Patent
Bigarre et al.

(10) Patent No.: US 10,056,627 B2
(45) Date of Patent: Aug. 21, 2018

(54) NON-INVASIVE MEASUREMENT METHOD FOR CONTROLLING THE FUNCTIONING OF A MEMBRANE FUEL CELL

(71) Applicant: Commissariat a L'Energie Atomique et aux Energies Alternatives, Paris (FR)

(72) Inventors: Janick Bigarre, Tours (FR); Herve Galiano, La Ville aux Dames (FR); Pierrick Buvat, Montbazon (FR); Serguei Martemianov, Buxerolles (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 108 days.

(21) Appl. No.: 15/007,736

(22) Filed: Jan. 27, 2016

(65) Prior Publication Data
US 2016/0218382 A1    Jul. 28, 2016

(30) Foreign Application Priority Data

Jan. 28, 2015 (FR) ...................... 15 50653

(51) Int. Cl.
| | |
|---|---|
| H01M 8/04 | (2016.01) |
| H01M 8/04537 | (2016.01) |
| H01M 8/04858 | (2016.01) |
| H01M 8/04089 | (2016.01) |
| H01M 8/04746 | (2016.01) |
| H01M 8/1018 | (2016.01) |

(52) U.S. Cl.
CPC ... *H01M 8/04552* (2013.01); *H01M 8/04089* (2013.01); *H01M 8/04582* (2013.01); *H01M 8/04753* (2013.01); *H01M 8/04932* (2013.01); *H01M 8/04559* (2013.01); *H01M 8/04589* (2013.01); *H01M 2008/1095* (2013.01)

(58) Field of Classification Search
CPC ...................... H01M 8/04552; H01M 8/04492
See application file for complete search history.

(56) References Cited

U.S. PATENT DOCUMENTS

| | | |
|---|---|---|
| 576,313 A | 2/1897 | Holden |
| 6,103,409 A | 8/2000 | DiPierno Bosco et al. |

(Continued)

FOREIGN PATENT DOCUMENTS

| | | |
|---|---|---|
| DE | 10 2008 023 183 A1 | 11/2009 |
| EP | 2 017 630 A2 | 1/2009 |

OTHER PUBLICATIONS

French Preliminary Search Report dated Nov. 17, 2015 in French Application 15 50653, filed Jan. 28, 2015 (with English Translation of Categories of Cited Documents).

(Continued)

*Primary Examiner* — Matthew J Merkling
(74) *Attorney, Agent, or Firm* — Oblon, McClelland, Maier & Neustadt, L.L.P.

(57) ABSTRACT

The invention relates to a method for controlling the functioning of a fuel cell comprising at least one membrane, comprising the following steps:
putting at least two conductive means in contact with two different surface elements of the same first conductive plate, said plate being able to be a distribution plate belonging to a first cell,
measurement of one or more electrical voltages between said conductive means electrically connected to an electrical-voltage measurement device.

10 Claims, 5 Drawing Sheets

(56) References Cited

U.S. PATENT DOCUMENTS

| | | |
|---|---|---|
| 6,762,587 B1 | 7/2004 | Barbetta |
| 6,815,117 B2 | 11/2004 | Hauer |
| 6,949,920 B2 | 9/2005 | Mohri et al. |
| 2004/0091759 A1 | 5/2004 | Harrington et al. |
| 2005/0011453 A1 | 1/2005 | Okumura et al. |
| 2005/0175872 A1 | 8/2005 | Trabold et al. |
| 2005/0287402 A1 | 12/2005 | Maly et al. |
| 2006/0051628 A1 | 3/2006 | Lim et al. |
| 2006/0074574 A1 | 4/2006 | Gasda et al. |
| 2006/0083961 A1 | 4/2006 | Piccirillo et al. |
| 2007/0026273 A1* | 2/2007 | Okamoto .......... H01M 8/04097 429/414 |
| 2007/0279051 A1 | 12/2007 | Kataoka |
| 2008/0014478 A1 | 1/2008 | Tighe |
| 2010/0286939 A1 | 11/2010 | Oh et al. |
| 2011/0129749 A1* | 6/2011 | Reiser ............... H01M 8/04552 429/432 |
| 2013/0093456 A1* | 4/2013 | Cheng ................ H01M 8/0202 324/764.01 |
| 2014/0186734 A1 | 7/2014 | Jeong et al. |

OTHER PUBLICATIONS

Wei Dai et al. "A Review on Water Balance in the Membrane Electrode Assembly of Proton Exchange Membrane Fuel Cells", International Journal of Hydrogen Energy, vol. 34, 2009, 17 pages.

M. G. Santarelli et al. "Experimental Analysis of Cathode Flow Stoichiometry on the Electrical Performance of a PEMFC Stack", International Journal of Hydrogen Energy, vol. 32, 2007, 7 pages.

U.S. Appl. No. 13/878,578, filed Jun. 28, 2013, 2013/0280620 A1, Herve Galiano et al.

U.S. Appl. No. 14/407,563, filed Dec. 12, 2014, 2015/0187514 A1, Herve Galiano et al.

U.S. Appl. No. 14/127,344, filed Feb. 12, 2014, 2014/0175326 A1, Herve Galiano et al.

U.S. Appl. No. 14/237,091, filed Feb. 4, 2014, 2014/0168855 A1, Herve Galiano et al.

U.S. Appl. No. 14/356,420, filed May 6, 2014, 2014/0309386 A1, Pierrick Buvat et al.

U.S. Appl. No. 14/355,925, filed May 2, 2014, 2014/0309318 A1, Pierrick Buvat et al.

U.S. Appl. No. 14/394,559, filed Oct. 15, 2014, 2015/0093654 A1, Herve Galiano et al.

U.S. Appl. No. 14/405,375, filed Dec. 3, 2014, 2015/0155600 A1, Herve Galiano et al.

U.S. Appl. No. 14/785,066, filed Oct. 16, 2015, Bruno Ameduri et al.

U.S. Appl. No. 14/785,006, filed Oct. 16, 2015, Michael K. Streckewald.

U.S. Appl. No. 14/778,487, filed Sep. 18, 2015, Stephane Cadra et al.

U.S. Appl. No. 14/903,135, filed Jan. 6, 2016, Herve Galiano et al.

* cited by examiner

NON-INVASIVE MEASUREMENT METHOD FOR CONTROLLING THE FUNCTIONING OF A MEMBRANE FUEL CELL

TECHNICAL FIELD

The invention relates to a method for controlling and optimising, in real time, the functioning of a fuel cell. The invention relates to the technical fields using a fuel cell as an energy source, a means for storing electricity, such as for example transport, roaming communication systems (portable electronic devices), stationary electrical production systems or electrical/thermal co-generation systems for dwellings.

PRIOR ART

Membrane fuel cells of the PEMFC (proton exchange membrane fuel cell) or DMFC (direct methanol fuel cell) type are currently experiencing rapid development because of their very promising potential in the fields mentioned above.

The operating principle of a membrane fuel cell, or cell, is based on an oxidation reaction and a reduction reaction. These two chemical reactions are complementary and are carried out simultaneously on either side of a proton exchange membrane or electrolyte 2 (FIG. 1). The names of membrane fuel cells are generally related to the nature of the oxidised element: methanol for cells of the DMFC type, hydrogen for cells of the PEMFC type. The functioning of a PEMFC cell is based on the oxidation of a fuel or reactive gas, comprising hydrogen, in contact with a plate or surface 20, comprising one or more catalytic materials, such as for example platinum. The hydrogen in contact with this electrode or anode 20 oxidises in accordance with the following reaction:

$$2H_2 \rightarrow 4H^+ + 4e^- \tag{1}$$

The products of this reaction are separated at the anode 20. The electrons diffuse through a diffusion layer 25 before joining the surface 44 of the distribution plate 40. This distribution plate comprises, at its surface, one or more channels, open and parallel to the surface 22 of the anode 20. This channel or channels enable the fuel to flow between the distribution plate 40, the diffusion layer 25, the anode 20 and the membrane 2. The fuel is introduced into the channel 46 through an opening or orifice 49 and emerges through an opening 60. The openings are situated on the face of the distribution plate 40, situated opposite the face 44 comprising said channel.

So that the reaction 1 is not interrupted, the fuel is introduced continuously into the channel 46, at a pressure that may be between 1 and 4 bar absolute, and a temperature generally between 60° C. and 80° C. In order to guarantee a sufficient addition of gas and a sufficient discharge of water, the gas is introduced into the subcell with slight over-stoichiometry, for example between 1.2 and 1.5. The H⁺ ions or protons diffuse through the membrane, a proton exchange membrane or electrolyte 2, until they reach the surface of a cathode 30. The membrane is on the other hand impermeable to the fuels introduced on the anode and cathode side in order to prevent their reacting directly together. The membrane may be composed of one or more layers containing, for example, sulfonated perfluorinated hydrocarbons (PFCs).

A second diffusion layer 35 is interposed between the cathode 30 and a distribution plate 50. This distribution plate comprises, on its surface 52, one or more channels 56, similar to the channel 46, that is to say open and parallel or substantially parallel to the surface 34 of the cathode 30 (FIG. 4). The distribution plate 50 is connected to the diffusion plate 40 by one or more conductive elements, not shown in the figures, to enable the electrons produced by the reaction 1 to flow from the distribution plate 40 to the distribution plate 50 and from the distribution plate 50 to the cathode 30. The flow of the electrodes from the anode 20 to the cathode 30, coupled to the electrochemical potential that appears between the two distribution plates, enables the cell to deliver, according to the operating conditions, an electrical power of between 0.5 and 1.5 W/cm². The channel 56 comprises two openings, situated generally on a face of the face 52 on which said channel is situated. A second reactive gas, comprising oxygen, circulates continuously in the channel 56 so that the functioning of the cell is not interrupted, at a pressure that may be between 1 and 4 bar absolute and a temperature between 60° and 80° C. In order to guarantee a sufficient addition of gas and a sufficient discharge of the water produced at the cathode, the gas is introduced into the cell with slight over-stoichiometry, between for example 1.5 and 2.0.

The oxygen and electrons in contact with the plate or surface 30, covered with one or more catalytic materials, for example platinum, react with the protons, H⁺, in accordance with the following reduction reaction:

$$4H^+ + 2O + 4e^- \rightarrow 2H_2O \tag{2}$$

The reaction 2, taking place on the surface of the cathode 30, produces water, discharged from the cell, by means of the gas circulating in the channel 56.

The above elements may be assembled, in accordance with FIG. 2, in order to form a cell core or subcell 10. The subcell may be composed of the elements 40, 25, 20, 2, 30, 35 and 50 disposed on the axis $\vec{j}$ in this order. It is possible to associate a plurality of "subcells" together, reproducing the above order of assembly. FIG. 2 shows a fuel cell composed of three cores: 10, 10' and 10". The distribution plates 40 and 50', 40' and 50" may be joined or fabricated, so as to form a single distribution plate, referred to as a dual-pole distribution plate. The channels situated on the opposite faces of a dual-pole distribution plate do not communicate with each other and are impervious, and each cell core is thus isolated from the adjacent cores. The dual-pole distribution plate may have a thickness of between 300 μm and 3 mm along the axis $\vec{j}$.

Once the fuel cell is assembled or mounted, it can be started up by introducing, in each cell compartment, the fuels in the channels situated at the interfaces between distribution plate and diffusion layer. For a fuel cell of the PEMFC type, the fuel introduced between the distribution plate 40 and the diffusion layer 25 is a gas composed of pressurised hydrogen, while the fuel introduced between the distribution plate 50 and the diffusion layer 35 is a gas based on oxygen or pressurised air. The fuels start and maintain the oxidation-reduction reactions that take place in the cell. It is for this reason that they are introduced continuously into the cell. The surfaces where the oxidation-reduction reactions 1 and 2 take place are referred to as active surfaces or active zones. The surfaces or zones are said to be dead with none of the above reactions is taking place. The power of the cell depends on the proportion of active surface.

The fuel cells may be of different shapes: circular, oval, rectangular, square or other. To function optimally, a PEMFC combines various sometimes opposing conditions.

Firstly, the operating temperature is as high as possible, while maintaining sufficient hydration, for the protons to be able to diffuse through the membrane 2. The permeability to protons or the proton conductivity of the membrane is one of the factors limiting the reaction 2. As from 60° C., the membrane has a tendency to dry out, mainly at the entrance to the channels 46 and 56, under the combined effect of the temperature and the flow of reactive gas. This drying phenomenon creates dead zones or surfaces. To keep the membrane moist and therefore to keep a large proportion of active surface, the reactive gases may be hydrated, via an external device. This technique affords correct functioning of the cell, in air, up to 80° C. The pressure of the gases is also a parameter promoting good hydration of the membrane but this means the use of an air compressor that consumes a large quantity of energy and thereby reduces the overall efficiency of the cell.

Secondly, for the electrochemical reactions to take place continuously, it is sought for the fuels to be in contact with the catalyst present at the surface of the electrodes. However, excessive hydration of the core of the cell may give rise to an accumulation of water in the pores and at the surface of the electrodes and diffusion layers. Water, in liquid form, is more or less permeable to the reactive gases, limiting or stopping the electrochemical reactions 1 and 2 in the cell. The proportion of dead zones also increases, causing a rapid and almost irreversible drop in the voltage of the cell, at a high current output. The phenomenon of flooding of the cell is then spoken of. In order to prevent this phenomenon, the water is discharged regularly, by means of the reactive gases flowing in the channel or channels situated at the interface between distribution plate and diffusion layer, or by other means, in particular by draining the cell. It is for this reason that, generally, the gas flow rate of a fuel is greater or lesser than the quantity of gas necessary for the electrochemical reactions 1 and 2. The ratio between the gas flow introduced into each compartment and the gas flow necessary for the reaction is defined by the coefficient $\lambda$. This coefficient is a value normally between 1.5 and 2.0 for a PEMFC cell on the air side and 1.2 to 1.4 on the hydrogen side. It is nevertheless more advantageous to have a value of $\lambda$, as close as possible to 1 in order to economise on the fuels.

Because of the nature of the membranes currently on the market, they need to be strongly hydrated in order to function correctly. However, the operating temperature of the cell and the flow rates of fuels in the core of the cell promote the dehydration of the membrane. The power delivered then drops. To moisten the membrane, the reactive gases are generally hydrated, before they are introduced into the cell ("Experimental analysis of the effects of the operating variables on the performance of a single PEMFC", M. G. Santarelli and M. F. Torchio, Energy Conversion and Management 48 (2007) 40-51). Conversely, if the gas flow is not sufficient, the water generated at the cathode accumulates at the electrodes and ends up by flooding them. The power then drops very quickly since the dead zones become a majority compared with the active zones. It is therefore management of the water that ensures correct functioning of a PEMFC cell. The optimum adjustment of a cell results from a continuous compromise between drying of the membrane and flooding of the electrodes; in other words, it is a case of determining in real time the best proportion between the active zones and the dead zones ("A review on water balance in the membrane electrode assembly of proton exchange membrane fuel cells", W. Dai, H. Wang, X. Yuan, J. J. Martin, D. Yang, J. Qiao and J. Ma, Int J Hydrogen Energy 2009; 32: 9461-9478). It is for this reason that numerous techniques for diagnosing the phenomenon of drying and/or flooding of a membrane fuel cell have been developed, a few examples of which are presented below.

The methods for detecting flooding of the electrodes ("water flooding") are numerous. The information relating to the presence of water may be obtained by means of the method of interrupting the current or measurements of impedance (US 2004/0091759, US 2005/0287402, US 2006/0074574, US 2006/0083961, US 2010/0286939, US 2014/0186734). The method of interrupting current has become conventional; however, it gives solely global information. In addition, the impedance method is relatively expensive and difficult to interpret.

Other methods compare measurements of one or more electrical characteristics, of a subcell or stack, with reference values, such as for example measurements of the electrical potential of one or more subcells, the differences of these potentials, the relationships between these potentials, etc. According to the differences between the measurements and the reference values, transient actions or responses are implemented in order to ensure correct functioning of the cell. For example, in the document U.S. Pat. No. 6,762,587, two equivalent electrical models (static and dynamic) are used to establish a diagnosis of the state of the cell. Measurements of the electrical potential (mean value) and these variations over time (standard deviation) are made simultaneously in order to diagnose the flooding of the catalytic sites by water or drying of the membrane. The measurements of the current/voltage curve under non-stationary conditions (interruption of the current, for example) are proposed as a diagnostic means in US 2006/0051628. The use of these electrical methods is relatively simple but they afford only a global characterisation of the cells without taking account of the existence of local defects. The predictivity of these global methods therefore remains limited.

Another method is based on measurements of the distribution of electric currents through an active surface of a cell. Various modifications to this method were proposed later (US 2007/0279051; EP 1755188). The main drawback of these techniques is the need to use a subcell with a specific configuration that is expensive and difficult to implement in the context of industrial applications.

There does not currently exist any technique that is non-invasive and simple to use on a fuel cell in actual operation, without modifying its structure, making it possible to identify locally the phenomenon or phenomena responsible for the voltage drop and to determine the origins thereof. The object of the invention presented here is to respond to this expectation.

DISCLOSURE OF THE INVENTION

The invention relates to a method for controlling the functioning of a membrane fuel cell composed of one or more subcells. A subcell or cell core may be composed of a membrane placed between two electrodes. The two electrodes are placed between two distribution plates, which may delimit said subcell. One or more elements may be interposed between the two distribution plates. In particular, a diffusion layer may be placed between an electrode and a distribution plate. The distribution plate supplies reactive gases to the cell and/or illuminates the products of the electrochemical reactions taking place in said subcell. It also collects the electrons generated at the anode and contributes the electrons necessary to the electrochemical reaction at the cathode.

According to the invention, the steps of a method for controlling the functioning of a cell may be as follows:

putting at least two conductive means in contact with two different surface elements of the same first conductive plate, said first plate being able to be a distribution plate belonging to a first subcell, measuring a plurality of electrical voltages, between said conductive means, electrically connected to an electrical-voltage measurement device.

The conductive means are put in contact with a surface element of the plate in order to sense or measure the difference in potential between different surface elements of said plate. In particular, these conductive means may be spikes formed in a conductive material. The conductive means may be electrically connected by means of tracks, rods, electric cables or the like, to an electrical-voltage measurement device.

One of the conductive means may be in contact with the same surface element of a conductive plate, while a second conductive means is put in contact, successively, with one or more different surface elements of said plate. The voltages may be measured between the two conductive means, when the conductive means are in contact with different surface elements.

The voltage measurements may be made on at least two different conductive plates making up the cell. These measurements may for example be made on a first plate, then on a second plate, or even at the same time on said plates.

The conductive means may be put in contact with a conductive plate comprising at least, on one of its faces, a channel for distributing the reactive gases and/or recovering the products of the cell. Preferably, the conductive means are placed in the vicinity of, or as close as possible to, the distribution and/or recovery channel or channels.

The electrical-voltage measurements may be done in terms of voltage or direct current or current modulated at various frequencies. One or more voltages may be measured according to the current density in the subcell or subcells in the stack.

An operator and/or an automatic device, for example a computer, may modify, according to a value or a plurality of values of previous measurements, at least one operating parameter of the cell, in order to increase or reduce the power of said cell.

The invention also relates to a device for controlling the functioning of the fuel cell. The full cell comprises at least one subcell composed of a membrane, two electrodes, two distribution plates with at least on one of their faces a channel for distributing the fuel gases and/or a channel for recovering the products of the electrochemical reactions performed in the subcell, and at least one first conductive plate that may optionally be one or the two said distribution plates; at least two conductive means are in contact, or intended to be or designed to be in contact with two different surface elements of the same first conductive plate.

According to an alternative, at least two different conductive plates making up the cell may comprise at least two conductive means in contact or intended to be or designed to be in contact with a first plate and at least one other conductive means in contact or intended to be or designed to be in contact with a second plate.

According to a variant of the above devices said conductive means are placed in the vicinity of or close to or as close as possible to the distribution and/or recovery channel or channels.

The conductive means may be connected or designed to be connected electrically to a voltage measurement device for measuring one or more electrical voltages between said conductive means. The measurements are optionally communicated by means forming an electronic interface to a computer and/or an operator.

The above voltage measurements may be done in terms of DC voltage and/or current modulated at various frequencies, or according to the current density in the subcell or subcells of the cell.

One of the above devices may comprise a device for controlling the functioning of the fuel cell that can modify at least one operating parameter of the cell, in order to increase or reduce the power of said cell, according to one or more voltages measured.

Figure 8:
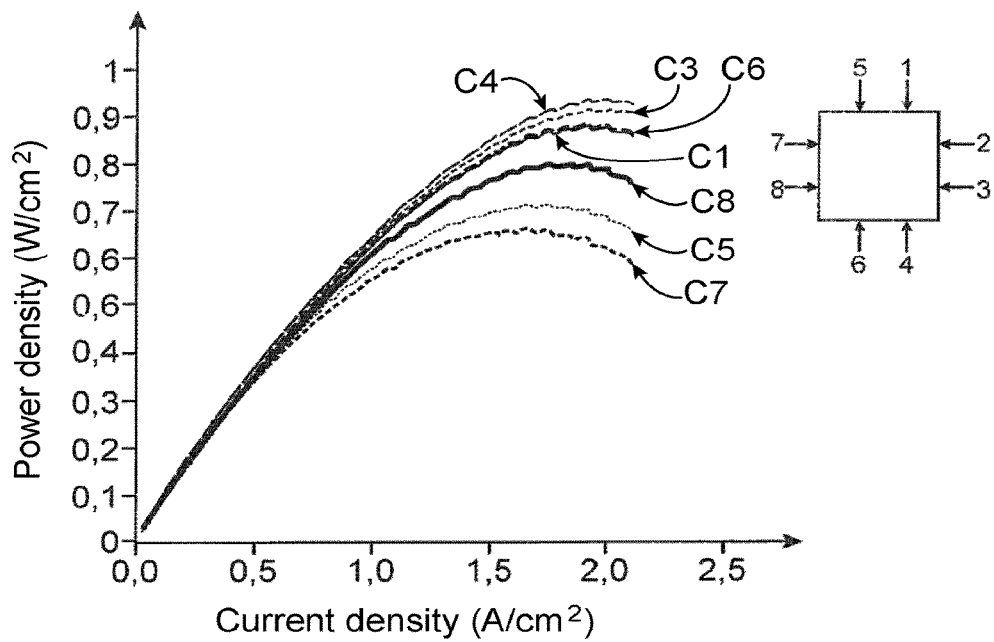

The curves in FIG. 8 depict the power density, between a plurality of conductive means, as a function of the current density in the subcell.

Figure 9:
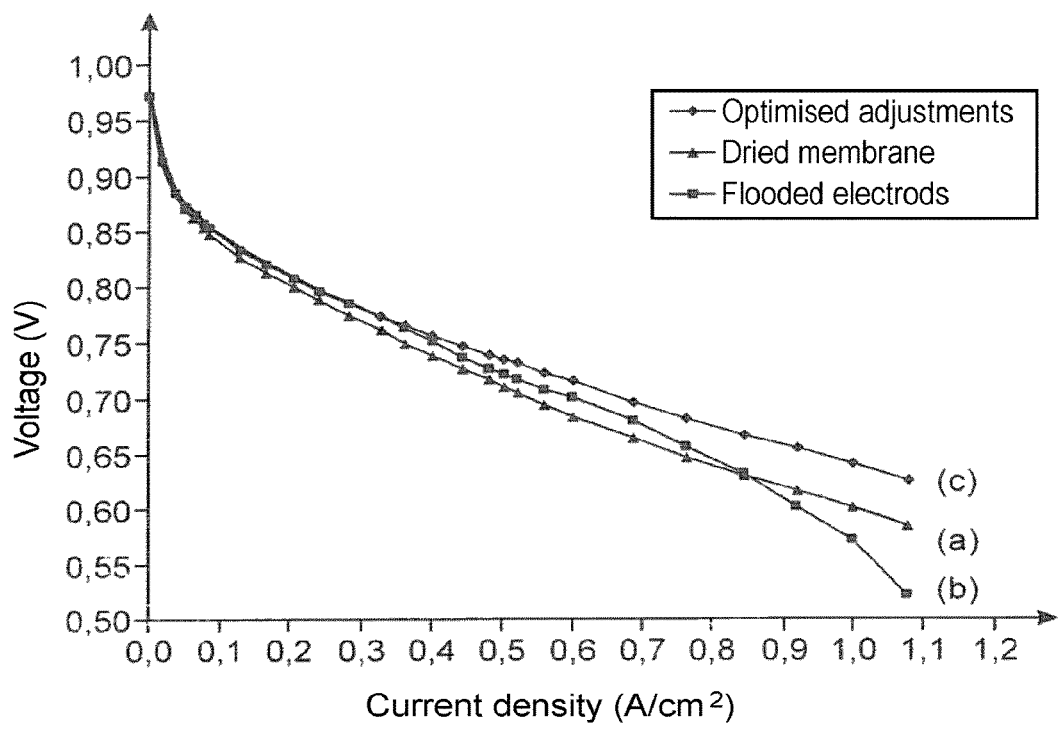

FIG. 9 gives the biasing measurements of a cell according to the state of the cell.

DETAILED DISCLOSURE OF PARTICULAR EMBODIMENTS

The subject matter of the invention is a non-invasive electrical-voltage measurement method for controlling and/or optimising the functioning of a fuel cell. This method may be implemented on all types of fuel cell or cell comprising a membrane placed between two distribution plates. The distribution plates make it possible to supply the cell with fuel and to discharge the products obtained, in liquid and/or gas forms. The cells comprising one or more membranes may be of the "proton exchange membrane fuel cell" (PEMFC) or "direct methanol fuel cell" (DMFC) type or any other type of membrane fuel cell. The following examples illustrate several methods implemented, according to the invention, on a PEMFC cell. They are not limitative and can be transposed to other types of membrane fuel cell.

Figure 1:
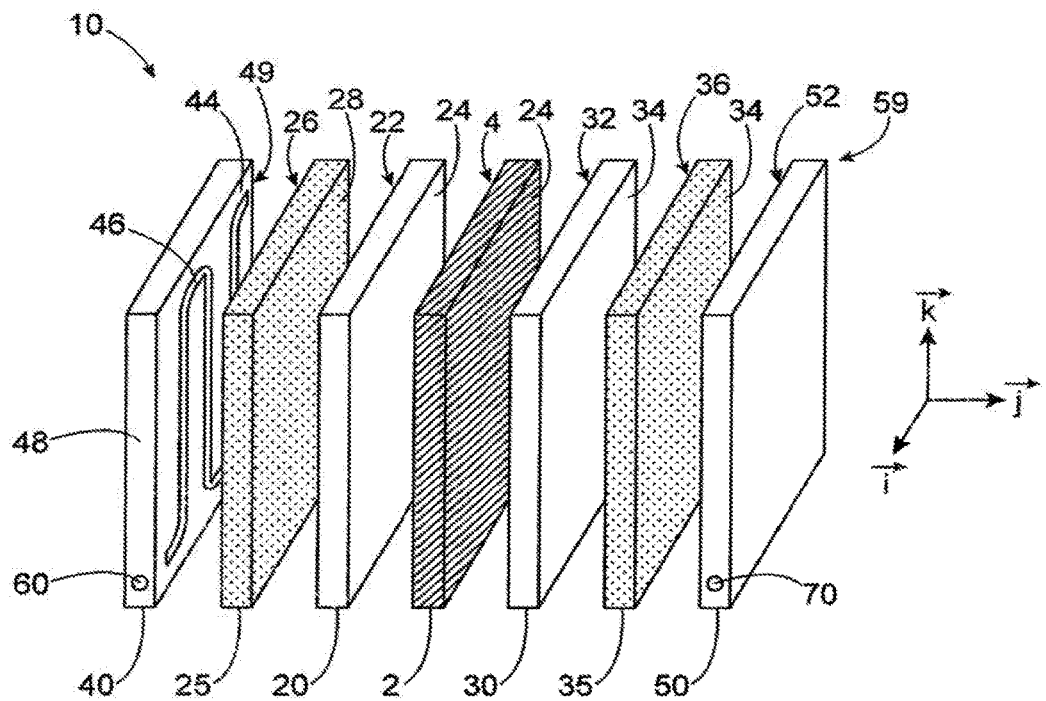
FIG. 1 depicts in perspective the elements that may make up a subcell of a membrane fuel cell.
Figure 2:
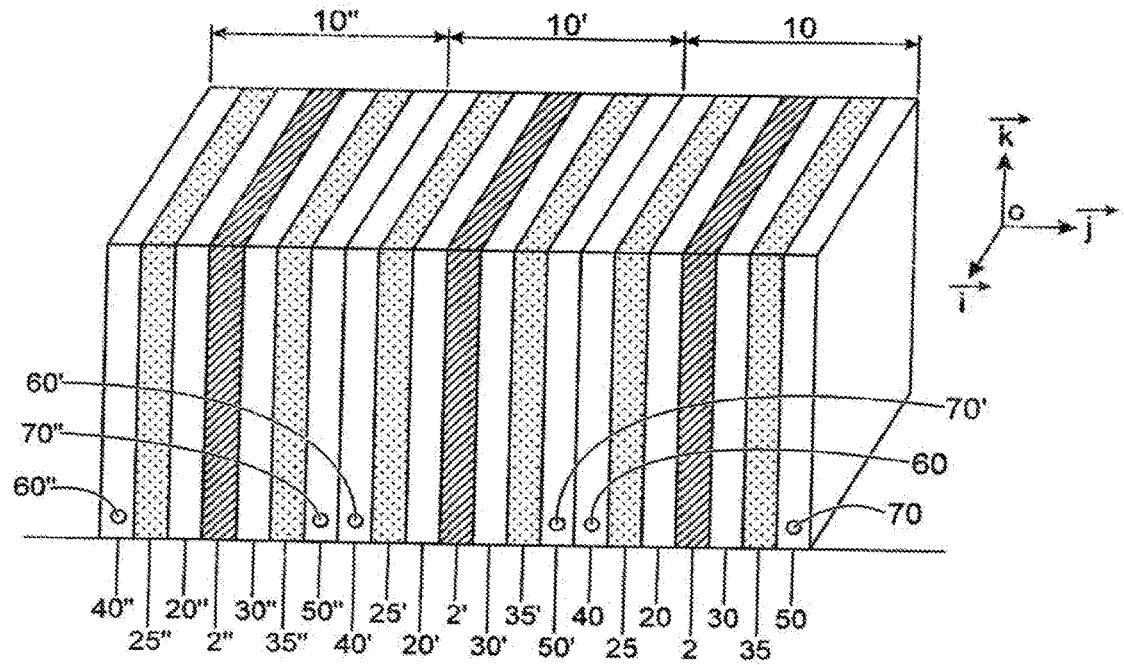
FIG. 2 depicts a cell comprising several subcells, the elements of which are assembled.

A fuel cell or cell of the PEMFC type may comprise at least one cell core or subcell 10 composed of the previously described elements 40, 25, 20, 2, 30, 35 and 50, along the axis $\vec{j}$ and in this order (FIG. 1). The faces and the cross-sections of the elements making up the cell, parallel or substantially parallel to the plane [0;], may have similar or substantially similar dimensions so that the external face or faces of the cell, faces perpendicular or substantially perpendicular to the plane $[O; \vec{i}; \vec{k}]$ have regular or substantially regular surfaces as depicted in FIG. 2. The membrane is a membrane with a thickness of between 1 μm and 300 μm, preferably 20 μm.

The electrodes 20 and 30 are preferably porous layers that can be produced from carbonaceous materials. The electrodes comprise at their surfaces a material with catalytic properties. In the example presented here, this material is platinum. The thickness of the anode 20 and of the cathode 30 is between 1 μm and 200 μm, preferably 20 μm.

The diffusion layers 25 and 35 may be produced from porous materials that may have a thickness of between 5 μm and 500 μm, preferably 200 μm.

The surfaces of the distribution plates, dual-pole or not, in contact with at least one diffusion layer, comprise at least one channel, the ends of which are situated on a free face of the distribution plates. The thickness of the distribution plates is between 0.2 mm and 5 mm, preferably around 3 mm. The distribution plates are conductive, their conductivity is greater than 10 S/cm, or between 10 S/cm and 800 S/cm, preferably between 50 S/cm and 200 S/cm, in order to be able to measure a variation in electrical potential on a surface element of the distribution plate, preferably positioned at the periphery of a face, when a variation in electrostatic voltage occurs on another surface element, preferably close to the centre of a face. The distribution plates used in this example have a surface conductivity of approximately 100 S/cm.

After assembly of the above elements, the cell 10 is started up when a first hydrogen-based gas is introduced into the channel 46 situated at the interface between the distribution plate 40 and the diffusion layer 25, and a second oxygen-based gas into the channel 56 in contact with the diffusion layer 35 and the distribution plate 50 (FIG. 1). The two reactive gases may be introduced into the channels at a pressure of 2 bar absolute and at a temperature of 70° C. The pressure and temperature may vary and be different between the two fuels. The reactive gases may be introduced at a pressure of between 1 and 4 bar, preferably 2 bar, and a temperature of between −20° C. and 150° C., preferably between 60° and 80° C.

A first step according to the invention may consist of measuring the voltage between at least two surfaces or surface elements belonging to said conductive plate, for example the distribution plate 40 or the distribution plate 50. This step is preferably performed on functioning cells without modification to their structure. For this purpose, the voltage measurements are done on the free, preferably lateral, surfaces of said plate or surfaces not covered by another material such as the diffusion layer 25 or 35. Voltage measurements are advantageously carried out in function of time and recorded in order to evaluate the temporal change of said voltages.

This first step may be performed as soon as the cell is started up or after it is run in. In the context of this example, the electrical-voltage measurements are made after running in the cell core 10. The running in can be done for 8 hours as follows. The fuels, respectively oxygen and hydrogen, are introduced at a pressure of 2 bar absolute and at a temperature of 70° C. into the channels 46 and 56 respectively. The value λ, the stoichiometric ratio of the gases, is 1.5. The current intensity per unit surface area of the cell is 0.5 A/cm². Running in under these conditions ensures optimum moistening of the membrane before the first voltage measurements on the distribution plate 40 or 50. The cell then has an active surface of around 25 cm². The running-in parameters are the initial operating parameters of the subcell 10.

The voltages are measured at the surface of one of the conductive plates, by conductive means or sensors, put in contact with a free surface zone of said plate, for example a distribution plate. These conductive means may be connected to the distribution plate permanently, they may be welded, or adhesively bonded, or screwed, etc. According to an alternative, the conductive means may be connected to the distribution plate by contact, temporarily during the measurements. These means may be metallic in nature, in particular in the form of a spike. For example, a first spike P1 or conductive spike is put in contact with a free surface element of the distribution plate 50 in an arbitrary fashion; preferably the contact point is close to the entrance of the channel 56 (at a few mm, for example between 1 mm and 5 mm or 10 mm, therefrom), situated on the surface 52 of the distribution plate 50. The spike P1 is the reference potential for measuring the voltages, and its position is preferably unchanged during the method.

Other spikes, the number of which is not limited, may be put in contact with other free surface elements of the same distribution plate. In FIGS. 3a, 3b and 4, 7 other spikes (P2-P8) are put in contact with different surface elements of the same distribution plate 50. The contact points may be situated on the faces perpendicular or substantially perpendicular to the plane $[O; \vec{i}; \vec{k}]$ and preferably situated as close as possible to the channel 56, as depicted in these figures.

Figure 3A:
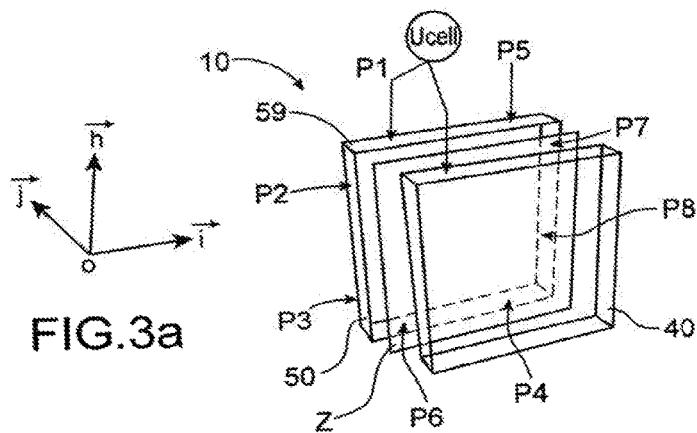
In FIGS. 3a and 4 the possible positions are indicated of the conductive means, on the surfaces of the plates of a membrane cell for measuring the electrical voltages.
Figure 3B:
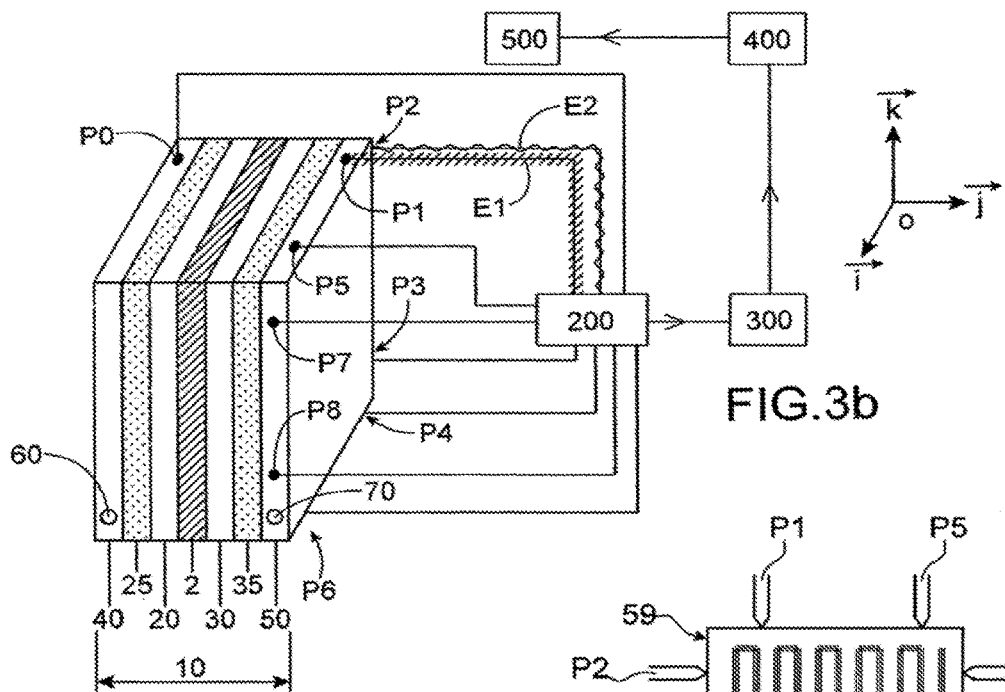
In FIG. 3b, these conductive means are connected to a voltage measurement device that is connected to an electronic interface in contact with an operator who can modify the operating parameters of the cell.

The spike P1 is electrically connected, by means for example of an electric cable E1, to a voltage measurement device 200 (FIGS. 3a and 3b). This device may comprise a voltmeter, preferably with high sensitivity, capable of measuring potential differences that may range up to a nanovolt. It makes it possible to measure the voltages between the spike P1 and the other spikes.

Optionally, a spike P0 may be put in contact with a free surface of the second distribution plate belonging to the same subcell core 10, such as for example the distribution plate 40 (the contact point of the spike P0 on the distribution plate 40 may be in the vicinity of or at the entry of the gases). The spike P0 is connected to the aforementioned electrical-voltage measurement device (FIG. 3a).

Figure 4:
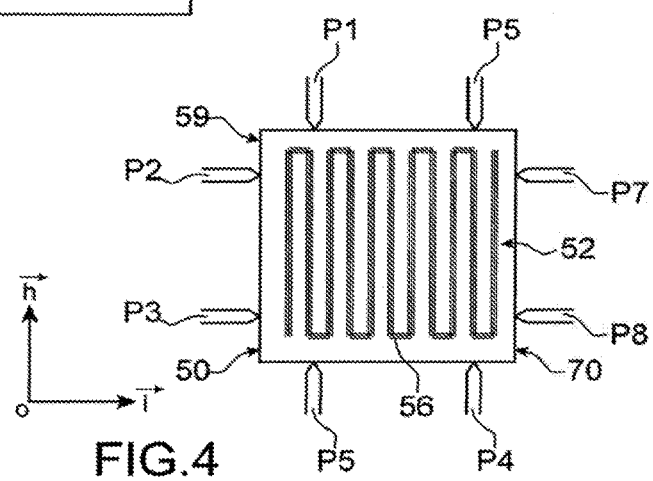
Figure 5:
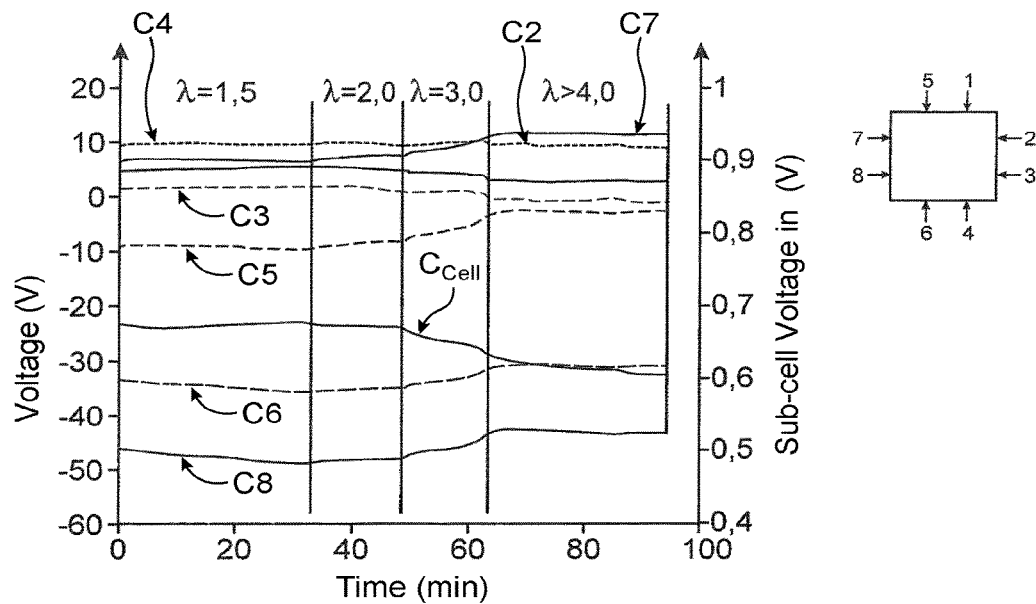
FIG. 5 gives the voltage measurements between the conductive means, as a function of time and of the value of $\lambda$.

The voltage between the spike P1 and the spike PX is denoted CX or channel X. The voltage between P0 and P1 is denoted $U_{subcell}$, it may be a reference measurement of the voltage of the subcell 10. The voltages measured are set out, as a function of time, in FIG. 5. It will be observed that the voltages or initial voltages, C2 to C8 and $C_{subcell}$, are substantially stable when the stoichiometric ratio of the oxygen λ, is around 1.5. This value corresponds to a flow rate conventionally used for cells of this type. When the oxygen rate is increased to attain a λ of around 2, 3 and greater than 4, the reference voltage $C_{cell}$ drops. The same applies to the voltages V2 and V3, which correspond respectively to the voltages measured between the spike P1 and respectively the spikes P2 and P3 positioned close to the entrance 59 of the channel 56 (FIG. 4). On the other hand, the voltages C5, C6, C7 and C8, which correspond respectively to the voltages measured between the spike P1 and respectively the spikes P5, P6, P7 and P8, positioned close to the exit 70 of said channel, increase. The increase in the oxygen rate in the channel 56, at a constant hydrogen rate in the channel 46, enables a greater quantity of water to be discharged without increasing the quantity of water produced by the electrochemical reaction 2 at the cathode 30.

The flow of gas therefore dries the membrane along the entrance of the channel 56, a phenomenon unfavourable to the diffusion of the H$^+$ ions through said membrane. The reduction reaction 2 is thereby limited; the number of electrical charges moving towards the zone composed of the distribution plate 50, the diffusion layer 35, the cathode 30 and the dried membrane 2 drops close to this zone. The electrostatic voltage at the surface of the distribution plate 50, in contact with the aforementioned zone, also decreases. The electrical-voltage measurements between the reference spike P1 and the spikes placed on the distribution plate 50, in the vicinity of the dry membrane, relate this phenomenon through a drop in the voltages C2 and C3 (see FIG. 5). The reference voltage $C_{subcell}$, measured between the spike P1 and the spike P0, decreases substantially in the same way as the voltages C2 and C3 since the spike P1 is also situated close to the entrance of the channel 56. On the other hand, the reverse behaviour is noted for the voltages C5, C6, C7 and C8. The spikes P5, P6, P7 and P8 are positioned close to the exit of the channel 56. At the end of the channel, the moisture level of the reactive gas is higher than when it is introduced into the channel. The quantity of water in this zone that can be discharged by the gas is therefore smaller (saturation of the reactive gas with water). Consequently water is often present in excess in this part of the subcell, generally in liquid form. However, the presence of liquid water on the surface of the cathode is detrimental to the reduction reaction 2. Therefore a value of λ greater than 1.5 makes it possible to discharge this excess water, thereby increasing the active surface (not covered with liquid water) in the zone situated in the vicinity of the exit of the channel 56. The number of electrostatic charges therefore increases on the surface of the plate in contact with this once again active zone. The voltages measured, between the spike P1 and the spikes P5 to P8, increase because of this phenomenon, referred to as drying. When the oxygen rate is increased in order once again to reach a λ value of around 1.5, the voltages slowly regain their initial values because of the rehydration of the membrane and the flooding of part of the cathode. This shows the reversible character of the drying phenomenon.

Figure 6:
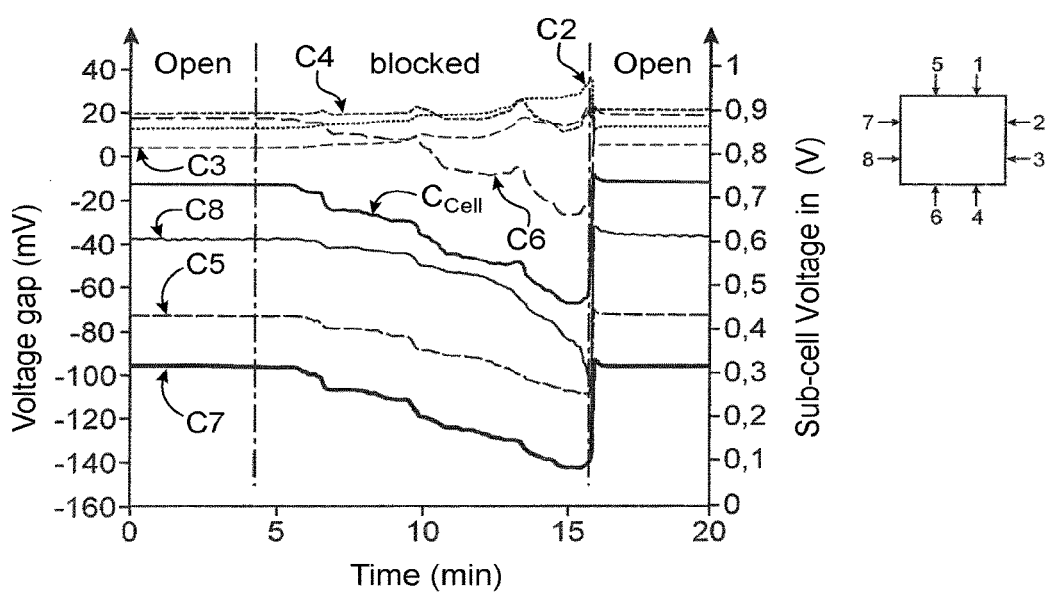
FIG. 6 gives the voltage measurements between the conductive means before, during and after the functioning of the cell in blocked mode.

One opening, for example the opening 70, is next blocked by a closed drain valve. The cell then functions in "blocked" mode. Consequently the products of the reaction 2 can no longer be discharged from the subcell 10; in the present case the product is water. The proportion of water molecules then increases in the channel 56, promoting the hydration of the membrane in a zone close to the entrance of the channel and therefore the reaction 2. The voltages C2, C3 and C4 correspond to the spikes put in contact with the distribution plate 50, in a zone close to the channel entrance. They increase since the membrane is better hydrated in this zone (FIG. 6). On the other hand, the water, since it can no longer be discharged, is present in excess at the other end of the channel, close to the blocked outlet. The surfaces of the cathode, in this second part of the cell, are then covered with water, and the voltages C6, C7 and C8, corresponding to the spikes put in contact with the distribution plate 50, in a zone close to the channel exit, then decrease. This phenomenon corresponds to the "flooding" of the cell. The electrical voltages of the conductive spikes return to their initial values when the drain valve is opened.

The voltage measurements between the distribution plate 40 and the distribution plate 50, $U_{subcell}$, relate these phenomena clearly. However, these examples show clearly that a single measurement of this type does not represent the state of the cell. A measurement of this type is a measurement partially relating the functioning of the cell and is therefore an insufficient measurement for controlling and optimising a membrane fuel cell.

According to the invention, the electrical voltage measurements carried out on various surface elements of the same plate make it possible to know, in real time and locally, the distribution of the electrostatic voltages on the surface of a distribution plate making up a subcell of a fuel cell. It has thus been possible to observe that the drying of the membrane, essentially close to the entrance 59 of the channel 56, and the flooding of an electrode, essentially close to the exit 70 of the channel 56 are reversible and non-homogeneous phenomena within the same subcell. Some zones of the subcell are more disposed than others to these phenomena. For example, the zones of the subcell close to the entrance of the fuel supply channel are the first zones to be dried when λ has a value greater than 1.5. Conversely, it is the zones of electrodes 40 and 50 closest to the channel exit that are inclined to the flooding phenomenon when the cell is functioning in "blocked" mode. It is therefore possible to detect, preferably early, one or other of these phenomena, by giving particular attention to one or other of these zones, by measuring the variation in electrical voltage between a reference conductive means and one or more conductive means placed on the same distribution plate, on the near surface zones, preferably as close as possible to the zone to be monitored, where the phenomenon is liable to occur.

The previous voltage measurements, advantageously as a function of time, will therefore be markers or indicators of the functioning of the cell in order to detect early, for example, its flooding. For this purpose, the spikes P1, P6, P7 and P8 may be disposed as in FIGS. 3a, 3b and 4, in order to be in contact with surface elements of the distribution plate 50, close to the exit of the channel 56. A drop in the voltages C6, C7 and C8 compared with the initial voltages will then be synonymous with the presence of an excess of water in this part of the subcell and the start of flooding of the electrode 50. The previous voltage values may be communicated to an operator or to a computer 400, by means of an electronic or digital interface 300 (FIG. 3b), so that the operator can perform actions on the operating parameters 500 of the cell 10 in order to control, locally or globally, the flooding of the cell. For example, the operator, in order to control or stop the flooding of the cell, may perform one or more of the following actions: increase the flow of fuel and/or open and/or increase the frequency of opening of the drain valve, and/or increase the temperature and/or decrease the degree of humidification of the fuel introduced into the channel, etc. It is possible to automate the control by implementing a feedback loop that will act on the gas flows or on the degree of hydration of the incoming gases.

According to an alternative, the voltage measurements performed previously in direct current can be made in modulated current, at various frequencies, so as to determine the local complex impedance and thus identify the nature of the phenomenon causing the power of the cell to drop. One or more electrical voltages may be measured according to the current density in the subcell or subcells of the cell in order to obtain a biasing curve.

Impedance spectrometry measurements may be made by imposing a supplementary alternating current with respect to the current output by the cell. This current preferably has low amplitude compared with the current generated by the cell so as not to interfere with the electrochemical balances involved.

Under these conditions, it can be considered that the system remains in a semi-stationary state and that the current voltage response is almost linear. The amplitude of the alternating current is generally around 10% with respect to the direct current.

To measure the impedance (or complex resistance), the voltage at the terminals of the cell is measured simultaneously with the current signal. The impedance is then defined by the ratio:

$$Z^* = U^*/I^*$$

where $Z^*$ is the complex impedance:

$$Z^* = Z' + jZ'',$$

$U^*$ is the complex voltage:

$$U^* = U' + jU'',$$

and $I^*$ is the complex current:

$$I^* = I' + jI''.$$

Various devices for analysing the current and voltage signals make it possible to obtain directly the complex values of the impedance: the real part ($Z'$) and the imaginary part ($Z''$). The spectroscopy measurement is obtained by making an impedance measurement for various excitation frequencies, in general from a few tens of kHz to a few tenths of 1 Hz. In this way an impedance spectrum is obtained. This measurement makes it possible to separate the rapid phenomena (electron and proton conductions) from the slower phenomena such as the diffusion of the gases or the flooding of the electrodes. Thus the resistance at high frequencies gives the value of the resistance of the membrane whereas the diffusion resistance is obtained at low frequencies.

In general, the voltage is measured at a single point, at the gas entries of the two dual-pole plates. It should be noted that, here, several voltage measurements are made simultaneously at various points, preferably "strategic", on the dual-pole plate for a global variation in current. Under these conditions, an impedance spectrum is measured for each measurement point. It is then possible to quantify the change in the various components of the voltage drop for each point. For example, drying of the membrane at the gas entry will be represented by an increase in the resistance at high frequencies whereas flooding at the discharge from the cell will produce an increase in the resistance at low frequencies.

Figure 7:
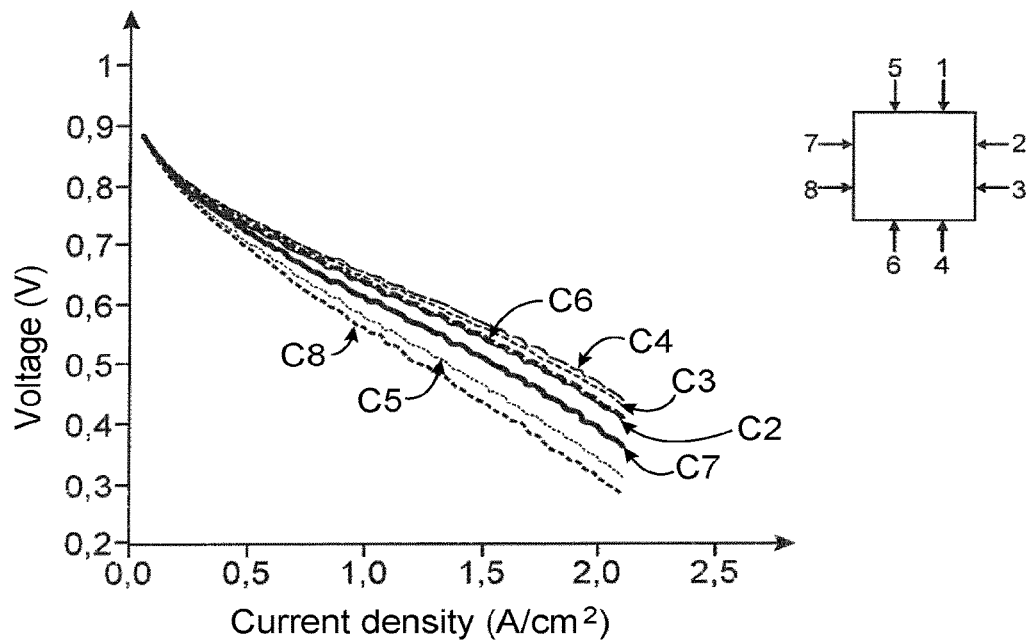
FIG. 7 depicts the curves for the biasing of a subcell of a cell as a function of the voltages measured between various conductive means.

According to a variant of the previous methods, biasing curves may be measured using various conductive means or spikes. The biasing curves represent the change in the voltage of the subcell according to the current density imposed between its distribution plates. These curves make it possible to assess the behaviour of a subcell or of a stack during operation. The subcell voltage is generally taken on the distribution plates at the channel entrances. The device according to the invention makes it possible to measure biasing curves using various surface zones with the conductive spikes P1 to P8 and P0. In FIG. 7, the biasing curves corresponding to the end of the channels (C5, C7 and C8) are much less good (lower voltages) than the biasing curves corresponding to the start of the channels (C2, C3 and C4) because of the accumulation of liquid water at the channel discharge. Conversely, the curves C2, C3 and C4 are better than the standard curve traced with the subcell voltage C1 or $C_{subcell}$. In this example, the maximum power density delivered on the channel 4 is increased by 5% with respect to C1 (see FIG. 8) compared with the conventional measurement mode. This shows that the measurement method proposed here also makes it possible to select the measurement points that are most favourable for obtaining the highest power density or densities. FIG. 9 shows the biasing curves obtained in various operating modes: drying of the membrane, flooding in blocked mode and optimised conditions. The method proposed makes it possible to increase the performances of the cell beyond 10%, preferably between 10% and 20%, by optimising the operating parameters, as described above.

According to a first alternative, the voltage measurements are made simultaneously on two conductive plates making up the subcell 10, for example on the distribution plate 40 and 50.

The method according to the invention may also be reproduced, simultaneously or not, on a plurality of subcells making up a fuel cell, as illustrated in FIG. 2, in order to follow the changes in the voltages along the channels of each subcell and thus to optimise the functioning of the fuel cell comprising several subcells. In the case of a stack (an association of a plurality of subcells), it is mainly the phenomena acting at the cathode (flooding of the electrodes, limitation of the diffusion of the gas by pressure drop in the channels, drying of the membrane, etc.) that limit the voltage of the dual-pole plate. In this case, the voltage measurements will be taken with reference to the flow of the gas at the cathode (entry and exit). Thus the optimisation of the operating settings of the stack will be achieved by modifying solely the parameters concerning the cathode (gas flow rate, moistening, etc.).

The invention also relates to a stack or device as described above, in which another plate or rod (not shown in the figures), which is conductive, may be placed or interposed between the membrane 2 and the distribution plate 40 or 50 when the subcell 10 is manufactured. A cell according to the invention may be composed of at least two fixing or electrical connection means, for example P1 and P2, situated on at least the same conductive or semi-conductive plate, for example a distribution plate 50 (FIG. 3b). These fixing means may be electrical connectors fixed permanently to the distribution plate 50, by means of holes produced on the sides of the plate 50. For thick dual-pole plates, the voltage tappings may be made by producing holes in the thickness of the dual-pole plate and plugging in plugs of the micro-banana or micro-connector type. For thinner metal plates, it is possible to directly weld the wires onto the plate. Adhesive bonding is more tricky since it does not guarantee good electrical contact. The fixing means are preferably placed as close as possible to the distribution channel or channels.

The device may further comprise two means E1 and E2 for electrically connecting the fixing means P1 and P2 to the device 200. These means may be electric cables, optionally attached permanently; or non-permanently by screwing or clipping or inserting, or otherwise in said fixing means. The electrical voltage values measured between said means of fixing by the device 200 may be communicated by means forming an electronic interface 300, to an operator or a computer 400. Actions may then be performed on at least one of the operating parameters of the cell 10, according to the voltage values measured.

A drop in the voltage measured close to the gas inlet indicates a drying of the membrane due to the effect of the flow of gas. It is then sought to hydrate the membrane. This may be done by increasing the relative humidity level of the gas and/or by reducing the flow rate of gas in order to dry less. Conversely, a drop in the voltage at the gas outlet indicates a start of a flooding of the electrodes. It is then sought to increase the gas flow and/or to effect a drainage by opening the gas outlet valve completely, for example for a few seconds, so as to produce a flushing effect.

When the cell is composed of more than two subcells, more than three electrical connection or fixing means may be fixed to two conductive plates belonging to the same subcell or to two different subcells.

The electrical connection means may be connected to a device 200 for measuring a continuous electrical voltage or one modulated at various frequencies. The device 200 may be replaced by a device measuring voltage according to the current density in the subcell or subcells.

The methods and devices according to the invention makes it possible to monitor, in real time and locally, the state of functioning of a membrane fuel cell, from electrical voltage measurements on the free surfaces of one or more distribution plates making up the cell. The voltage measurements are non-invasive since they are carried out on the accessible parts of the plates of the cell. From these measurements, an operator or an automatic device can adapt the operating parameters of the cell in order to increase the electrical power produced.

The invention claimed is:

1. Method for controlling the functioning of a fuel cell comprising at least one membrane, the method comprising:
    putting at least three conductive means in contact with different surface elements of a first conductive plate, said first conductive plate being a distribution plate belonging to a first subcell of the fuel cell,
    measuring a first electrical voltage between a first surface element of the first conductive plate and a second surface element positioned near a point on the first conductive plate where gas enters a channel for distributing the gas, and
    measuring a second electrical voltage between the first surface element and a third surface element positioned near a point on the first conductive plate where gas exits the channel.

2. Method for controlling the functioning of a fuel cell according to claim 1, in which the first and second electrical voltages are measured by an electrical-voltage measurement device and are communicated by an electronic interface.

3. Method for controlling the functioning of a fuel cell according to claim 1, in which a first conductive means is maintained in contact with the first surface element of the first conductive plate, while a second conductive means is put in contact successively with the second surface element and the third surface element, a measurement being made for each contact of the second conductive means with each of the second and third surface elements.

4. Method for controlling the functioning of a fuel cell according to claim 1, in which at least three conductive means are put in contact with at least three different surface elements of the first conductive plate, electrical-voltage measurements being made between one of said conductive means and each of the other conductive means.

5. Method for controlling the functioning of a fuel cell according to claim 1, further comprising:
    putting at least three conductive means in contact with different surface elements of a second conductive or semi-conductive plate, said second plate being a distribution plate belonging to the first subcell or to another subcell of the fuel cell,
    measuring a third electrical voltage between a fourth surface element of the second plate and a fifth surface element positioned near a point on the second plate where gas enters a channel for distributing the gas, and
    measuring a fourth electrical voltage between the fourth surface element and a sixth surface element positioned near a point on the second plate where gas exits the channel.

6. Method for controlling the functioning of a fuel cell according to claim 5, the electrical-voltage measurements on the first and second plates being performed simultaneously.

7. Method for controlling the functioning of a fuel cell according to claim 1, in which said conductive means are placed on a surface of the first conductive plate parallel with a stacking direction of layers in the fuel cell.

8. Method for controlling the functioning of a fuel cell according to claim 1, in which the electrical voltage measurements are made in direct current.

9. Method for controlling the functioning of a fuel cell according to claim 1, in which the electrical voltages are measured according to the current density in the first subcell of the fuel cell.

10. Method for controlling the functioning of a fuel cell according to claim 1, in which, according to the first and second electrical voltage measurements, at least one operating parameter of the fuel cell is modified.

* * * * *